United States Patent [19]

Hutton

[11] 3,756,267

[45] Sept. 4, 1973

[54] SERVICE TAP TOOL

[76] Inventor: Walter C. Hutton, P.O. Box 158, Hesperia, Calif. 92345

[22] Filed: Mar. 3, 1972

[21] Appl. No.: 231,481

Related U.S. Application Data

[63] Continuation-in-part of Ser. No. 84,784, Oct. 28, 1970, Pat. No. 3,646,954.

[52] U.S. Cl. .................................. 137/318, 408/105
[51] Int. Cl. ............................................ F16k 43/00
[58] Field of Search .......................... 137/318, 317; 408/105

[56] References Cited
UNITED STATES PATENTS

| | | | |
|---|---|---|---|
| 210,706 | 12/1878 | Penney | 137/318 |
| 3,516,426 | 6/1970 | Toll | 137/318 X |
| 3,460,721 | 8/1969 | Hamel | 137/318 X |

Primary Examiner—Alan Cohan
Attorney—Robert L. Parker, E. Roderick Cline et al.

[57] ABSTRACT

A boring bar for making a hot tap in a plastic main and locking arms for securing the device behind the shoulder of a coupling are coordinated so that the boring bar can only move longitudinally when the locking arms are in position behind the coupling and the locking arms cannot be rotated from their locked position unless the boring bar is in a predetermined longitudinal position. The body is adapted to be received in the bore of a coupling, and to seal the bore with an O-ring. Air admitted through the body forces the locking arms into tight engagement with the shoulder of the coupling by forcing the body and its carried locking arms longitudinally in a direction away from the shoulder. A hot tap is made by a shell cutter on the boring bar.

13 Claims, 3 Drawing Figures

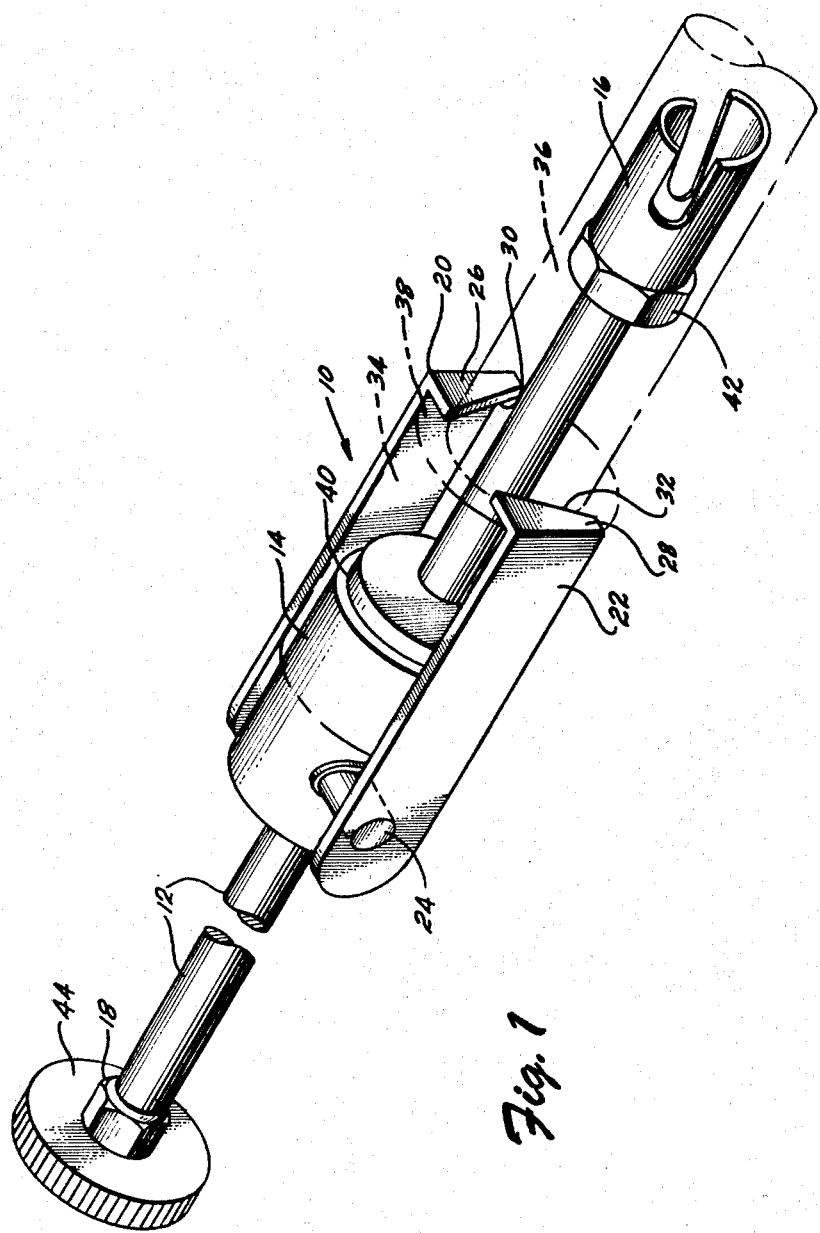

SERVICE TAP TOOL

CROSS-REFERENCE TO RELATED APPLICATION

The present application is a continuation-in-part of application Ser. No. 84,784, filed Oct. 28, 1970 now U.S. Pat. No. 3,646,954 issued Mar. 7, 1972.

BACKGROUND OF THE INVENTION

The present invention relates in general to the art of tapping pipes containing a fluid under pressure and, more in particular, to a service tap tool which is especially adapted for effecting such a tap in the making of a branch connection and which provides positive locking coordination between its locking arms and its boring bar.

Plastic pipes are becoming increasingly common for supplying fluids under pressure, for example, natural gas.

It is often necessary to make a branch connection from a main to provide a new service outlet. Obviously, it is impractical, in many instances, to turn off the gas supply in the main in order to establish a service branch connection.

As a consequence it has become established practice to make what is known as a "hot tap" of the main. This means that a hole in the main is made while a main contains gas under pressure. Obviously the tools used to make hot taps must not allow gas to escape to atmosphere. It is highly beneficial, if not mandatory, that the tools used to make a hot tap be uncomplicated, require a minimum amount of skill in their use, and be reasonably economical.

The service tap tool disclosed in the parent patent application referenced above satisfies the dictates of being simple, easy and quick to operate, and reasonably cheap to produce.

It is desirable, however, to coordinate the position of the boring bar and the locking arms such that the boring bar cannot move longitudinally until the locking arms are in position with their locking flanges behind the inner shoulder of the coupling. In addition, it is highly desirable not to have the locking arms rotate out of their locking position until the boring bar is completely free of the hole it has made.

SUMMARY OF THE INVENTION

The present invention provides an improved hot tapping tool which positively prevents its boring bar from moving with respect to its body until its locking arms are in position to engage the coupling of a branch connection and, moreover, to prevent disengagement of the locking arms from the coupling until the boring bar is in a predetermined longitudinal position.

A generalized form of the present invention envisions a body which receives a boring bar and at least one locking arm adapted to be placed in position behind an interior shoulder of a coupling on a branch connection. The boring bar carries means for cutting a hole in the main from which the branch connection emanates.

The locking arms and the boring bar are coordinated by means such that the locking arms cannot be rotated unless the boring bar is in the predetermined longitudinal location. In addition, when in that predetermined longitudinal location and upon rotation of the locking arms from their in-use position, the boring bar is incapable of moving longitudinally. Thus, operation of the service tap tool of the present invention is impossible unless the locking arms are in proper position, for if they are not in the proper position, the boring bar is incapable of sliding longitudinally with respect to the body. In addition, once longitudinal movement of the boring bar is initiated, it is impossible to rotate the locking arms out of position from behind the shoulder of the coupling. Consequently, there is no risk that the service tap tool will leave the coupling under pressure from gas entering the coupling from the main, once a tap has been made.

Preferably, means are provided on the body to insure a seal with the wall of the bore of the coupling. These means may include an O-ring.

The preferred means of coordinating the locking arms and the boring bar is to provide an annular groove in the boring bar at a predetermined location, and a cross pin for the locking arm which is received in this annular groove. A notch in the cross pin, when oriented parallel to the axis of the boring bar and facing the boring bar, permits longitudinal movement of the boring bar. The cross pin carries the locking arms.

Means are preferably provided to admit air into the space within the coupling between the body and the main for seating the tool, with the locking arms in firm gripping engagement with the interior shoulder of the coupling. It is also preferred to have locking flanges for the locking arms with wedge-like leading faces to grip the surface of a nipple on which the coupling is attached and to provide maximum surface engagement between the locking flanges and the coupling.

These and other features, aspects and advantages of the present invention will become more apparent from the following description, appended claims and drawings.

BRIEF DESCRIPTION OF THE FIGURES

FIG. 1 is a perspective view, partly broken away, of a preferred embodiment of the service tap tool of the present invention, showing its application with a coupling in the nipple, the latter combination being shown in phantom;

DESCRIPTION OF THE PREFERRED EMBODIMENT

Figure 3:
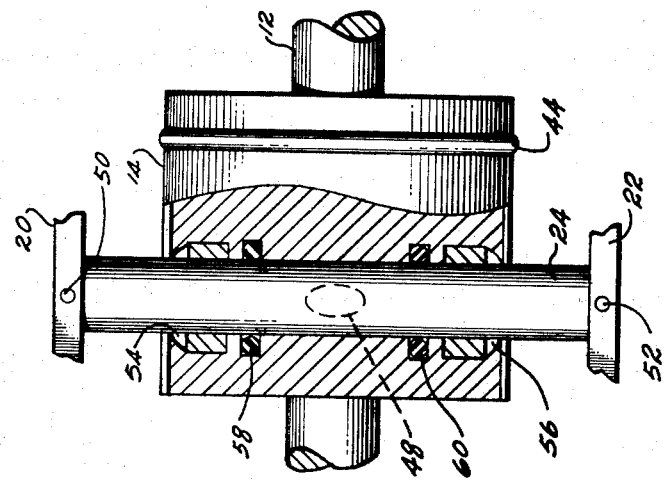
FIG. 3 is a plan, partly in section and fragmentary view, with the section plane being parallel to and including the longitudinal axis of the cross pin, as shown in general by the lines 3—3 in FIG. 2.

Before a detailed description of the service tap tool of the present invention is undertaken, a brief background description of the service tap tool and its function may be helpful. The service tap tool of the type germane here is adapted to tap a main carrying gas under pressure through a branch connection previously attached to the main. The branch connection, for its part, is constituted of a nipple and a coupling. The nipple is attached to the main, typically through a saddle. After these three units are attached together and to the main, it is necessary to tap a hole in the main to effect the completion of the branch connection. The service tap tool taps this hole. After a hole is effected, the boring bar of the service tap tool is withdrawn a predetermined distance and the nipple is pinched off to prevent gas from escaping until the balance of the branch connection is effected.

It will be appreciated that it is necessary to maintain the tool in proper position during effecting of a tap in the main to prevent gas leaking from the freshly tapped hole through the nipple and the coupling, and to prevent gas pressure from the main forcing the service tap tool out of its proper position. The present invention provides a very simple means for effecting these two goals. As previously mentioned, these means prevent movement of the boring bar until the locking arms are in proper position behind the interior shoulder of the coupling, and, once longitudinal movement of the boring bar has been accomplished, prevents removal of the locking arms from behind the shoulder of the coupling until the boring bar is returned to a predetermined position with respect to the locking arms.

FIG. 1 illustrates in general the combination of the present invention as it is being employed in the tapping of a main. The service tap tool is indicated in general by reference numeral 10. A longitudinally slidable boring bar 12 is received in a body 14 for longitudinal movement with respect to the body. Means to effect a hole in a main are provided at one end of the boring bar. Such means may include a shell cutter 16 of the type illustrated specifically in the Figure. Means, such as a wrenching nut 18, are provided for rotating or turning the boring bar to operate the shell cutter. A pair of rotatable locking arms 20 and 22 are carried by the body through a cross pin 24. Each locking arm has a locking flange. These flanges are indicated at 26 and 28 for locking arms 20 and 22, respectively. The flanges face the longitudinal axis of the boring bar. Each locking flange 26 and locking flange 28 has a wedge-shaped leading face 30 and 32, respectively, to effect contact with the surface of the nipple which connects the coupling to the main. In FIG. 1 a coupling and a nipple are shown in phantom and are indicated by reference numerals 34 and 36, respectively. Each locking flange has an interior face for engaging an interior shoulder 38 of the coupling. An O-ring 40 on body 14 provides a seal between the wall of the coupling and the outside longitudinal surface of the body against gas leaking out of the coupling between these two surfaces.

The shell cutter is secured to the boring bar as by threads and is locked in position as by a hex head nut 42. The means for rotating the boring bar, as previously mentioned, includes a wrenching nut 18 threaded onto the end of the boring bar opposite the shell cutter. Conveniently, a knob 44 may be used for effecting longitudinal movement of the boring bar, and some rotational movement without the aid of a wrench as well.

Figure 2:
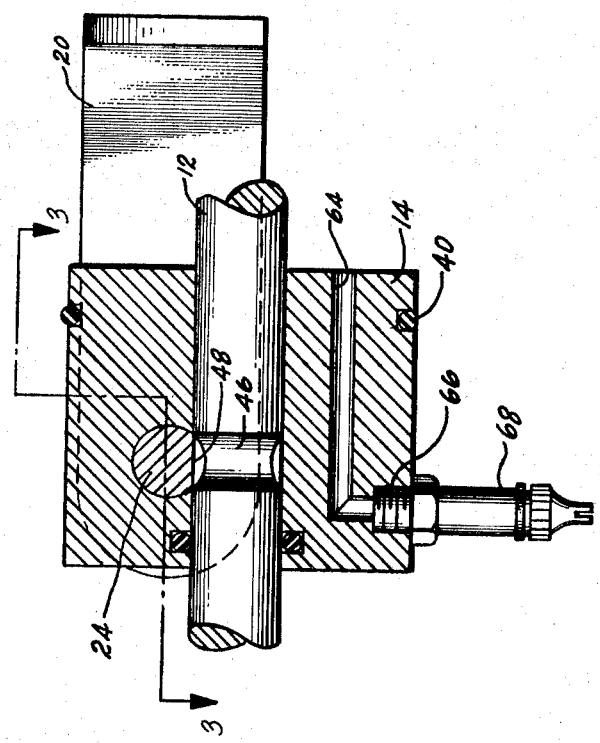
FIG. 2 is an elevational, fragmentary view, mostly in half section, showing the preferred interlock between the boring bar and the locking arms of the present invention.

With reference to FIGS. 2 and 3, the interlocking means of the present invention is illustrated in detail.

Boring bar 12 has an annular groove 46 disposed at a predetermined longitudinal location. The location of the annular groove corresponds to a distance from the end of the shell cutter that provides for the spacing of the shell cutter from the main well within the nipple. Cross pin 24 is received in the boring bar annular groove and normally blocks longitudinal movement of the boring bar by interference with it. A notched groove 48 in the cross pin, however, when in register with the boring bar allows for longitudinal movement of the boring bar and rotation of the locking arms. The notched groove is shown in register in FIG. 2. When the notched groove of the cross pin is out of register with the boring bar, longitudinal movement of the boring bar is impossible, but rotational movement of the locking arms is possible. Once, however, the annular groove of the boring bar passes to one side or the other of the cross pin with longitudinal movement of the boring bar, rotation of the locking arms is impossible. Thus during the making of a tap in a main, which would correspond to a position of the boring bar with the annular groove out of register with the cross pin, it would be impossible to rotate the locking arms from behind the interior shoulder of the coupling, and thus the tool is always securely in place against the force of pressure from the main. The boring bar must also be withdrawn from its boring position until annular groove 46 of the boring bar is in register with cross pin 24. With this registration the locking arms can be rotated out from behind the interior shoulder of the coupling for the removal of the tool. This insures that the shell cutter is removed from the main before an attempt is made to remove the tool.

As is illustrated in FIG. 3, each of locking arms 20 and 22 is secured to cross pin 24 through roll pins 50 and 52, respectively, which are received in drilled holes in the cross pin and the locking arms. The cross pin is received in a pair of bushings 54 and 56, which have a curved exterior profile to conform to the cylindrical curvature of body 14. O-rings 58 and 60 in the body and interiorly of the bushings prevent gas from escaping out the service tap tool from the main through the bore in the body which receives the cross pin.

With reference to FIG. 2, an O-ring 62 is provided in body 14 to the rear of cross pin 24 to prevent gas leaking through the bore which receives the boring bar and out the back of the body.

A longitudinal passage 64 extends from the front face of the body a distance towards the rear of the body and meets a cross passage 66. A standard air valve 68 is threadedly received in this cross bore and serves the function of pressurizing the coupling and nipple to force the seating of the tool firmly against the interior shoulder of the coupling prior to the cutting of a hole in the main.

In assembling the service tap tool of the present invention, boring bar 12 is placed in the longitudinal bore of body 14, with annular groove 46 of the boring bar and the face of the body which faces the interior of a coupling being on the same side of the body. The body is then positioned with respect to the boring bar such that the cross pin can be placed in the body, that is, the bore for the cross pin and the annular groove of the boring bar are aligned. The cross pin is then inserted. The cross pin is positioned such that its notch 48 will allow longitudinal movement of the boring bar. Bushings 54 and 56 are then inserted in the body. Locking arms 20 and 22 are then installed on the cross pin with the locking flanges oriented in their in-use position illustrated in FIG. 1, that is, in position for the locking flanges to fall in behind the shoulder of a coupling with the faces of the locking flanges oriented in wedge-like fashion for maximum contact of the interior shoulder of the coupling and for engagement of the nipple. So oriented, the locking arms and cross shaft are drilled for receipt of roll pins 50 and 52 and the roll pins installed.

The use of the service tap tool of the present invention has previously been described so this description will be limited. When a tap is to be made in a main, annular groove 46 and cross pin 24 are brought into register or alignment so that locking arms 20 and 22 can be rotated for clearing the coupling of the branch connection. Boring bar 12 cannot be moved longitudinally with the locking arms rotated out of their in-use position. The service tap tool is then inserted into the branch connection, with the body of the tool within the bore of the coupling and the annular O-ring on the exterior surface of the body in sealing engagement with the bore of the coupling. The locking arms are then rotated such that their locking flanges fall in behind the interior shoulder of the coupling. Air is then admitted through air valve 68 into the coupling and nipple to firmly seat the tool with the locking flanges in tight engagement with the shoulder of the coupling. In position behind the coupling, the boring bar is free to move longitudinally and can also be rotated. A tap can then be made. After a tap is made the boring bar is brought back into position with annular groove 46 in register with cross pin 24. This permits the pinching off of the nipple to prevent gas escape. If desired, air valve 68 can bleed the gas from the interior of the coupling between the pinch-off and the body of the service tap tool. Locking arms 20 and 22 are then rotated to clear the interior of the shoulder and the tool is withdrawn.

The present invention has been described with reference to a certain preferred embodiment. The spirit and scope of the present claims should not, however, necessarily be limited to the foregoing description.

What is claimed is:

1. A service tap tool for making a tap of a main through a branch connection comprising:
   a. a body adapted to be received in the bore of a coupling of the branch connection;
   b. means for effecting a pressure tight seal between the body and the wall of the coupling's bore;
   c. a boring bar received by the body for longitudinal movement with respect thereto along the axis of the body;
   d. means on the boring bar for effecting a hole in the main;
   e. at least one locking arm having means for engaging an interior shoulder of the coupling, the locking arm being rotatably mounted on the body for rotation into and out of engagement with the interior shoulder of the coupling;
   f. means for preventing longitudinal movement of the boring bar with respect to the body when the locking flanges of the locking arm are out of position to engage the interior shoulder of the coupling and to prevent rotation of the locking arms when the boring bar is moved longitudinally after the locking arms are in position to engage the interior shoulder of the coupling.

2. The service tap tool claimed in claim 1 wherein the preventing means includes:
   a. an annular groove in the boring bar at a predetermined longitudinal position corresponding to a position where the cutting means is withdrawn from the main;
   b. a cross pin received by the body and, in the predetermined position of the boring bar, in the annular groove of the boring bar; and
   c. a notch in the cross pin for permitting longitudinal movement of the boring bar when the notch faces the boring bar and is parallel to the longitudinal axis thereof, the locking arm being secured to the cross pin and carried thereby such that rotation of the locking arm with its axes paralleling the axis of the boring bar orients the notch in the cross pin to permit longitudinal movement of the boring bar.

3. The service tap tool claimed in claim 2 wherein at least two locking arms are provided, each being carried by the cross pin.

4. The service tap tool claimed in claim 3 wherein each locking arm has a wedge-shaped face oriented to engage the exterior surface of a nipple of the branch connection while at the same time engaging the interior shoulder of the coupling and to prevent rotation of the locking arms past their proper in-use position.

5. The service tap tool claimed in claim 4 wherein the cross pin is oriented along an axis normal to the longitudinal axis of the boring bar and spaced from that axis.

6. (amended) The service tap tool claimed in claim 4 [included] wherein the body has a longitudinal bore, the boring bar being received in the longitudinal bore, and a cross bore, the cross pin being received in the cross bore, and including:
   means to prevent gas from leaking through the bore which receives the boring bar; and
   means for preventing gas leakage through the bore which receives the cross pin.

7. The service tap tool claimed in claim 6 including means for admitting air under pressure into the coupling, such means being carried by the body.

8. The service tap tool claimed in claim 7 wherein the cross pin is oriented along an axis normal to the longitudinal axis of the boring bar and spaced from that axis.

9. An improvement in a service tap tool for making hot taps in a main having a fluid under pressure through a branch connection assembly affixed to the main, the branch connection assembly including a coupling and a nipple, the nipple being between the main and the coupling, the coupling having an interior shoulder facing the main, the service tap tool being of the type which has a body portion adapted to be received in the bore of the coupling and to effect a seal against gas passing from the coupling along the interface between the body and the bore of the coupling, at least one locking arm having a locking flange adapted to be positioned behind the interior shoulder of the coupling to prevent the service tap tool from being forced from the coupling by gas pressure, a boring bar received by the body for longitudinal movement with respect thereto and having means for effecting a hole in the main, the improvement which comprises:
   a. an annular groove in the boring bar at a predetermined longitudinal location, which predetermined longitudinal location corresponds to a location wherein the cutting means is removed from the main;
   b. a cross pin carrying the locking arm and received by the annular groove of the boring bar when the boring bar is in the predetermined location to prevent the boring bar from moving longitudinally; and
   c. a notch in the cross pin positioned to face the boring bar when the locking arm is in position behind the coupling to permit longitudinal movement of the boring bar with respect to the body.

10. The improved service tap tool claimed in claim 9 wherein at least two of the locking arms are provided, the locking arms being placed symmetrically on each side of the longitudinal axis of the boring bar.

11. The improved service tap tool claimed in claim 10 wherein each locking flange has a wedge-shaped face facing the longitudinal axis of the boring bar and oriented such that when the locking arms are in position behind the interior shoulder of a coupling the wedge-shaped faces rest against the nipple to prevent rotation of the locking arms past the nipple.

12. The improved service tap tool claimed in claim 11 wherein the longitudinal axis of the cross pin is at a right angle to the axis of the boring bar and is offset therefrom.

13. The improved service tap tool claimed in claim 12 including means for admitting air under pressure into the coupling to set the tool in the branch connection assembly.

* * * * *

PO-1050
(5/69)

UNITED STATES PATENT OFFICE
CERTIFICATE OF CORRECTION

Patent No. 3,756,267    Dated September 4, 1973

Inventor(s) Walter C. Hutton

It is certified that error appears in the above-identified patent and that said Letters Patent are hereby corrected as shown below:

In the claims: Claim 6, column 6, line 17, delete "(amended)"; column 6, line 18, delete "[included]".

Signed and sealed this 29th day of January 1974.

(SEAL)
Attest:

EDWARD M. FLETCHER, JR.
Attesting Officer

RENE D. TEGTMEYER
Acting Commissioner of Patents